(12) United States Patent
Vutetakis et al.

(10) Patent No.: US 6,641,951 B1
(45) Date of Patent: *Nov. 4, 2003

(54) BATTERY CELL TRAY ASSEMBLY AND SYTEM

(75) Inventors: David G. Vutetakis, High Point, NC (US); Christopher R. Cestone, Winston-Salem, NC (US); Stanley K. Wilkie, Lexington, NC (US)

(73) Assignee: Douglas Battery Manufacturing Company, Winston-Salem, NC (US)

( * ) Notice: Subject to any disclaimer, the term of this patent is extended or adjusted under 35 U.S.C. 154(b) by 298 days.

This patent is subject to a terminal disclaimer.

(21) Appl. No.: 09/723,709

(22) Filed: Nov. 28, 2000

Related U.S. Application Data

(63) Continuation-in-part of application No. 09/157,478, filed on Sep. 21, 1998, now Pat. No. 6,162,559.

(51) Int. Cl.[7] .................... H01M 2/02; H01M 10/02
(52) U.S. Cl. .................... 429/100; 429/66; 429/157; 429/183
(58) Field of Search ................... 429/100, 159, 429/183

(56) References Cited

U.S. PATENT DOCUMENTS

| | | | |
|---|---|---|---|
| RE23,644 E | 4/1953 | Grant | 136/145 |
| 2,956,100 A | 10/1960 | Mendelshon et al. | 136/146 |
| 4,029,855 A | 6/1977 | Dougherty et al. | 429/82 |
| 4,114,260 A | 9/1978 | DiGiacomo et al. | 29/623.1 |
| 4,216,280 A | 8/1980 | Kono et al. | 429/247 |
| 4,383,011 A | 5/1983 | McCelland et al. | 429/54 |
| 4,425,412 A * | 1/1984 | Dittmann | 429/53 |
| 4,525,438 A | 6/1985 | Pearson | 429/149 |
| 4,525,926 A | 7/1985 | Pearson | 29/623.1 |
| 4,546,053 A | 10/1985 | Sundberg | 429/57 |
| 4,587,181 A | 5/1986 | Gibson et al. | 429/59 |
| 4,618,545 A | 10/1986 | Clegg et al. | 429/130 |
| 4,652,505 A | 3/1987 | Komaki et al. | 429/131 |
| 4,713,304 A | 12/1987 | Rao et al. | 429/136 |
| 4,743,270 A | 5/1988 | McCartney, Jr. et al. | 29/623.1 |
| 4,780,379 A | 10/1988 | Puester | 429/59 |
| 4,788,113 A | 11/1988 | Bohle et al. | 429/139 |
| 4,859,710 A | 8/1989 | Ohmae et al. | 521/55 |
| 5,075,184 A | 12/1991 | Tanaka et al. | 429/144 |
| 5,091,275 A | 2/1992 | Brecht et al. | 429/247 |
| 5,250,372 A | 10/1993 | Willmann et al. | 429/146 |

(List continued on next page.)

OTHER PUBLICATIONS

Journal of Power Sources—Lead/Acid Recombination Batteries: Principles and Applications; N.E. Bagshaw; 1990; pp. 23–33.

The Battery Man—History of Valve Regulated Lead Acid Batteries in The United States; I.C. Bearinger; 1992; pp. 28–35.

The System—Hardigg Industries, Inc. brochure; date unknown but believed to be at least as early as 1998.

Copy of Technical Manual of Hovosorb entitled Lead–Acid Separators; Jan. 1994; 13 pages.

*Primary Examiner*—Mark Ruthkosky
(74) *Attorney, Agent, or Firm*—Womble Carlyle Sandrige & Rice, PLLC

(57) ABSTRACT

A battery system for battery powered vehicles which utilize valve-regulated, lead-acid cells, each cell being of the type that includes multiple positive and negative plates with separators therebetween assembled in a separate casing having exterior terminals outside the casing whereby the cells may be electrically interconnected. The flexible walls of the cells bulge outwardly when initially filled with electrolyte and uncompressed. The system includes a battery housing having at least one restraint extending horizontally between and attached to the side walls of the housing for preventing the bowing thereof, the restraint dividing the housing into at least two sections.

7 Claims, 7 Drawing Sheets

U.S. PATENT DOCUMENTS

| | | | |
|---|---|---|---|
| 5,336,275 A | 8/1994 | Zguris et al. | 29/623.5 |
| 5,366,827 A * | 11/1994 | Belanger | 429/99 |
| 5,376,477 A | 12/1994 | Aidman et al. | 429/141 |
| 5,384,211 A | 1/1995 | Choi et al. | 429/136 |
| 5,401,279 A | 3/1995 | Eisenhut et al. | 29/623.5 |
| 5,409,787 A | 4/1995 | Blanyer et al. | 429/66 |
| 5,441,123 A * | 8/1995 | Beckley | 180/68.5 |
| 5,468,572 A | 11/1995 | Zguris et al. | 429/247 |
| 5,512,065 A | 4/1996 | Kump et al. | 29/623.1 |
| 5,593,796 A | 1/1997 | Misra et al. | 429/204 |
| 5,635,312 A | 6/1997 | Yanagisawa et al. | 429/94 |
| 5,731,099 A | 3/1998 | Badget et al. | 429/72 |
| 6,162,559 A * | 12/2000 | Vutetakis | 429/100 |
| 6,372,377 B1 | 4/2002 | Ovshinsky et al. | 429/66 |

\* cited by examiner

BATTERY CELL TRAY ASSEMBLY AND SYTEM

RELATED APPLICATIONS

This application is a continuation-in-part of application Ser. No. 09/157,478, filed on Sep. 21, 1998, now U.S. Pat. No. 6,162,559 the content of which is incorporated herein by reference in its entirety.

FIELD OF THE INVENTION

The present invention relates to battery cell tray assemblies for power applications involving deep discharge duty cycles. More particularly, the invention relates to a battery cell tray assembly having a battery housing sized for holding and compressing multiple stacks of valve-regulated lead-acid battery cells arranged in a horizontal position.

BACKGROUND OF THE INVENTION

For quite some time it has been known that lead-acid batteries are particularly suitable for applications involving "deep discharge" duty cycles. The term "deep discharge" refers to the extent to which a battery is discharged during service before being recharged. By way of counter example, a shallow discharge application is one such as starting an automobile engine wherein the extent of discharge for each use is relatively small compared to the total battery capacity. Moreover, the discharge is followed soon after by recharging. Over a large number of repeated cycles very little of the battery capacity is used prior to recharging.

Conversely, deep discharge duty cycles are characterized by drawing a substantial portion of the battery capacity before the battery is recharged. Typical applications that require deep cycle capability include Class 1 electric rider trucks, Class 2 electric narrow aisle trucks and Class 3 electric hand trucks. Desirably, batteries installed in these types of vehicles must deliver a number of discharges during a year that may number in the hundreds. The cycle life of batteries used in these applications typically can range from 500–2000 total cycles so that the battery lasts a number of years before it needs to be replaced.

Until recently, only lead-acid batteries of the flooded variety have been utilized for the aforementioned deep discharge applications. Flooded lead-acid batteries are designed to have an excess of electrolyte that floods the cell container, completely saturating the plate group and extending into the head space above the plate group to provide a reservoir. The electrolyte reservoir is necessary because as the battery is charged, water in the electrolyte is electrolyzed into oxygen and hydrogen gases, which escape from the cell and deplete the electrolyte volume. To make up for the loss of electrolyte, water must be periodically reintroduced into the cell, or the reservoir must be made large enough to compensate for the expected loss over the life of the battery.

More recently, valve-regulated lead-acid (VRLA) batteries have been introduced that are suitable for deep discharge applications. VRLA batteries rely upon internal gas recombination to minimize electrolyte loss over the life of the battery, thereby eliminating the need for re-watering. Internal gas recombination is achieved by allowing oxygen generated at the positive electrode to diffuse to the negative electrode, where it recombines to form water and also suppresses the evolution of hydrogen. The diffusion of oxygen is facilitated by providing a matrix that has electrolyte-free pathways. The recombination process is further enhanced by sealing the cell with a mechanical valve to keep the oxygen from escaping so it has greater opportunity for recombination. The valve is designed to regulate the pressure of the cell at a predetermined level, hence the term, "valve-regulated".

There are two commercially available technologies for achieving the enhanced oxygen diffusion. One technology makes use of a gelled electrolyte. In gel technology, the electrolyte is immobilized by introducing a gelling agent such as fumed silica. Gas channels form in the gel matrix in the early stages of the cell's life as water is lost via electrolysis. Once the gas channels are formed, further water loss is minimized by the recombination process. Unlike a fibrous matrix, the gel matrix keeps the electrolyte immobilized and there is little bulk movement.

The other technology for enhancing oxygen diffusion makes use of a fibrous material separator between the electrodes. A widely used material for this purpose is an absorbed glass mat (AGM). The AGM is a nonwoven fabric comprised of glass micro-fibers that retain the electrolyte by capillary action, but also provide gas spaces as long as the matrix is not fully saturated with electrolyte. The electrolyte is still free to move within the matrix, but is more confined than in a flooded cell. Another fibrous material gaining acceptance is a non-woven mat constructed from a polymeric component such as polypropylene or polyethylene.

One important difference between the fibrous mat and gel technologies, stemming from the degree of electrolyte mobility, is the effect of cell orientation on cycle life. With fibrous mat technologies, particularly when dealing with cells over about 14 inches tall, it has been discovered that the cycle life in deep discharge applications can be significantly improved by arranging the cells so that the longitudinal axis of the cell lies in a horizontal plane rather than a vertical plane as is customary. With gel technology, there is little difference in deep cycle life when cells are arranged horizontally or vertically. Thus, to achieve maximum cycle life with fibrous mat constructions, it is desirable to orient the fibrous mat cells horizontally, but it is not necessary to orient gel cells horizontally. Presumably, this effect can be explained by stratification of the electrolyte in fibrous mat cells when subjected to deep discharge cycling due to the higher degree of mobility compared with gel technology. The stratification results in reduced discharge capacity and can only be reversed with great difficulty.

The benefits of valve-regulated, lead-acid cell batteries of the fibrous mat variety and cell arrangements for deep discharge applications are known in the art. Although there are applications that take advantage of horizontal cell orientation, they are not without their shortcomings. There is known a "monobloc" battery wherein individual cells are not individually formed and enclosed within separate containers. Rather, they are formed by installing plates in a housing having separate cell compartments, and filling each compartment with acid. Individual cell compartments are defined within the battery case between partitions that are sealed to the battery case walls. A significant disadvantage of this approach is the lack of flexibility to adapt the battery configuration to battery compartments of different sizes. That is, a "monobloc" battery constructed with 12 cells will not fit into a battery compartment sized to accept six cells. Another disadvantage of the "monobloc" approach is that, for applications requiring large capacity batteries, battery size may increase substantially. This large, heavy battery may be difficult to handle thus raising safety concerns for personnel and efficiency concerns for the powered equipment.

One of the solutions to these problems, as shown in the prior art, provides for the prefabrication of individual cells and the placement of individual cells in a preformed compartment in a steel tray assembly. Cell compartments are defined by cell-receiving members (partitions) attached to the tray. This approach is still somewhat limited in that each cell compartment is sized to accept only one or, at the most, two cells. Proper compression for the lead-acid cells is accomplished by limiting the cell compartments to one or two cells and dimensioning the cell compartments to be just slightly larger than the cell dimensions so that the cells may be moved into position without difficulty. Later, in use, the cell walls expand causing proper compression to be applied. Thus, for a tray to contain six cells, at least three, and possibly six, separately formed cell compartments are needed.

Recent research has demonstrated the necessity of initially applying and maintaining modest to high levels of compression in fibrous mat cells to keep the separators in close contact with the plates even before formation and use. Having multiple cell compartments, each dimensioned even slightly larger than the cells to be placed therein, will not achieve this. Further, for applications requiring vertically larger trays, it has been recognized that without partitions or restraints of some type, maintaining the walls of the tray vertical, without any appreciable bulging or flexing, is problematic. This is particularly so when six or more cells are stacked in the tray. The consequences of bulging or flexing are that proper compression on the cells may be lost and the structural integrity of the battery system may be jeopardized during use. One solution has been to increase the thickness of the side walls. While effectively reducing the bulging, this approach requires additional expense and tends to increase the overall width, weight, and cost of the battery assembly.

SUMMARY OF THE INVENTION

The present invention relates to a unique and improved housing for valve-regulated lead-acid (VRLA) batteries, and the battery system itself, used in applications requiring "deep discharge" duty cycles.

Specifically, the housing and system of the present invention are directed to deep discharge applications where the individual battery cells are arranged with the longitudinal axes of the cells lying in a horizontal plane, the cells being placed adjacent to and/or atop one another. This significantly improves the cycle life of each cell. Taking advantage of this horizontal orientation of battery cells requires that an appropriate amount of compression be applied to each cell. One approach is to employ various types of compression members within the housing (parent Pat. Ser. No. 6,162,559. However, another approach, and one object of this invention, is to dimension the entire battery housing to receive a desired number of stacks of formed cells where the distance between the housing walls parallel to the cell plates are slightly less than the combined uncompressed height of the stacks of electrolyte filled battery cells. As will be appreciated by those skilled in the art, the cell casings are typically manufactured to have flexible thermoplastic side walls Polypropylene is a commonly used material for this application. When the plates and separators (the plate and separator group) are inserted into the casing, the walls parallel to the plates will bulge. This bulging is the result of the sizing of the fibrous separator thickness such that the inner dimension of the casing is less than the uncompressed dimension of the plate and fibrous separator group. The plate and fibrous separator group must, therefore, be compressed to fit into the casing or jar. This compression is possible due to the sponginess of the separator. Once inside the casing, the plate and separator group exerts an outward force on the casing walls, causing them to bulge. By properly dimensioning the battery housing, when emplaced the casings will resume their original configuration, and the pressure exerted to eliminate the bulge will result in the proper compression on the plates and separators.

In certain configurations, such as those of the present invention, the battery housings are relatively taller, resulting in a greater height to width ratio. With a larger vertical dimension, the thin walls of the battery housing are even more susceptible to bulging after the stacks of battery cells have been compressed. The present invention solves this problem without the need for increasing the wall thickness of the side walls of the housing.

The housing of the present invention is of the type for receiving two or more stacks, each stack comprising at least three valvo-regulated, lead-acid cells, each cell being of the type that includes multiple positive and negative plates with separators therebetween assembled in a case having external terminals. The housing for the stacks of cells includes a base, a top wall, and a pair of side walls. Depending on the configuration, a rear wall with a removable end plate, or a central wall with two removable end plates, may be provided to support the end of cells and enclose the housing. The housing may be formed of steel or other suitable rigid or semi-rigid materials. Dependent upon the height of the battery housing, at least one restraint is provided to extend horizontally between and attach to the side walls of the housing for maintaining the side walls in a substantially vertical position so that they do not appreciably bulge outward and, thus, maintain proper compression on the sides of the battery cells. As used herein, the term "restraint" refers to both single-piece members, and to multiple-pieces collectively functioning to maintain the side walls of the battery housing substantially vertical. The restraints are selected and located so that they effectively divide the battery housing into two or more stack-receiving sections. For example, for two stacks of cells, one restraint would be required to divide the housing into two sections. For three stacks, two restraints might be required, etc. As used herein, the term "divide" means to separate into sections, but does not mean that the sections must be physically cut-off from one another or that the sections must be equally dimensioned. For example, a housing configured to hold 9 cells could be divided with one section dimensioned to receive 4 cells and another section dimensioned to receive 5 cells. Depending upon the type of restraint use, the sections may or may not be isolated from one another.

A wide range of shapes and materials may be used for forming the restraints of the present invention provided they possess the requisite tensile strength and a low degree of elasticity to hold the side walls in substantially vertical relation. They must also be capable of being welded, bonded, or mechanically attached to the interior side walls of the battery housing. For example, metals, plastics, fabrics, etc. may be used. With respect to geometry, a restraint may be formed as a single continuous sheet or plate, or may be perforated, or slotted. The restraint may also be formed as multiple smaller pieces such as a series of parallel strips, bands, or the like appropriately spaced apart and attached to the side walls such that the cells in contact with the strips are evenly compressed across their horizontal wall surfaces. The restraints may take on these many forms and be constructed of various materials since they are not required to, but may, function as structural shelves or supports for the stacks of cells.

The housing of the present invention may also be further divided into front and rear portions. That is, at least one inner partition, or wall, is so formed that stacks of three or more cells may be placed back to back.

As already described, the battery system of the present invention comprises at least two stacks of horizontally oriented cells, each stack having at least three separately cased cells. Proper dimensioning of the housing and cell-receiving sections formed therein is necessary to ensure that a good initial contact between plates and separators is established when the stacks of cells are assembled in the sections of the battery housing. In general, the battery housing will be dimensioned and appropriate thicknesses chosen for the restraints such that the inside vertical dimension of each cell-receiving section of the battery housing is less than the combined vertical dimension of the stacks of cells in their initially filled and uncompressed state. In an alternative embodiment, the cells are laid on their side so that the longitudinal dimension of the plates are horizontal but the plates rest on their side edge. In this arrangement the inside horizontal dimension of each cell-receiving section is less than the combined horizontal dimension of the stack of cells in their initially filled and uncompressed state.

These and other objects and aspects of the present invention will become apparent to those skilled in the art after a reading of the following description of the preferred embodiments when considered in conjunction with the drawings.

BRIEF DESCRIPTION OF THE DRAWINGS

The above and other objects, features, and advantages of the present invention will become more apparent and will be readily appreciated from the following detailed description of the preferred embodiments of the invention taken in conjunction with the accompanying drawings, in which.

DETAILED DESCRIPTION OF THE PREFERRED EMBODIMENT

Figure 1:
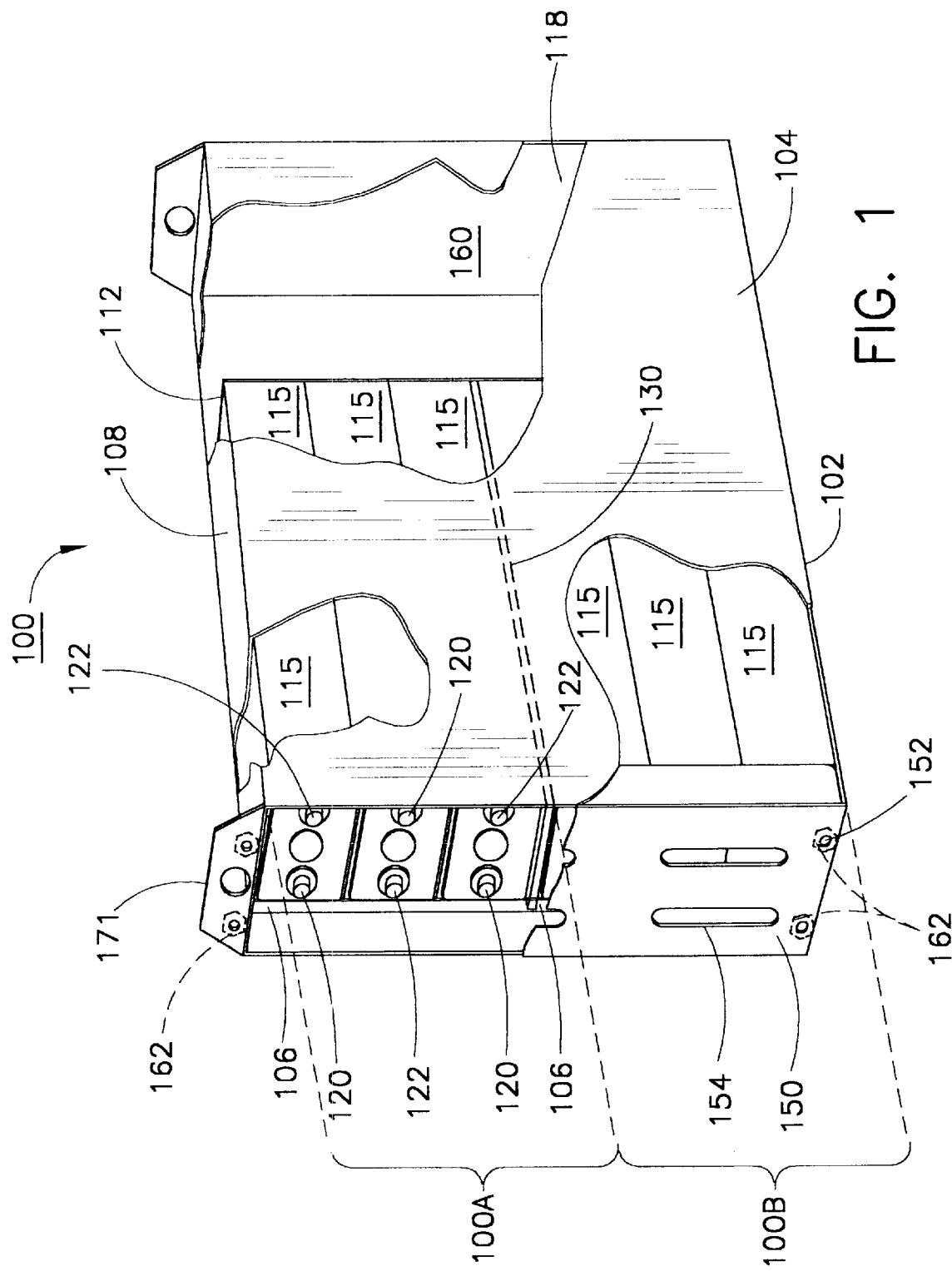
FIG. 1 is a front perspective cut-away view of a 6-cell battery system of the present invention.

As illustrated in FIG. 1, the system of the present invention includes a housing, generally designated as 100, of the type for receiving two or more stacks of battery cells 115, where each stack comprises at least three valve-regulated, lead-acid cells 115. Although FIGS. 1–6 do not include specifically the compression member as described in parent application Ser. No. 09/157,458, it should be realized that the description of that embodiment is important by reference herein, and the improvements described in this application are also applicable to the embodiments described in parent application Ser. No. 09/157,458. Therefore the "effective height" cell receiving chamber can either be the space between the bottom wall 102 and a compression plate as described in parent application 09/157,458.

In accordance with a first embodiment of the present invention, the housing 100 includes a base 102, a top wall 108, a pair of vertical side walls 104, and a rear wall 112. Housing 100 is formed of steel, but other suitable metallic or non-metallic materials that offer equivalent structural properties may be used. Such materials include aluminum, polyvinylchloride (PVC), or polyethylene. As shown in FIG. 1, housing 100 is dimensioned to receive two stacks of battery cells 115, each stack having three cells horizontally positioned therein. The term "cell," as used herein, refers to a single electrochemical unit including multiple positive and negative plates with separators therebetween. Each unit is assembled in a separate container, or casing having flexible (polypropylene) walls, and is electrically connected to the other cells at a point outside of the casing via the terminals 120, 122. Housing 100 further includes a restraint 130, discussed in detail below, that extends between and is attached to vertical side walls 104. In order to insure good initial contact between the plates and separators of the cells, it is necessary that, the effective height of the housing 100 (between bottom wall 102 and top wall 108) be slightly less than the combined height of uncompressed cells 115. Thus proper compression is provided by properly sizing compartment 100 (or using a compression member as described in parent application Ser. No. 09/157,458).

A front cover 150 protects the battery cell terminals and includes vent openings 154 to provide proper battery cell ventilation. The vent openings 154 are also positioned to provide access to battery terminals 120, 122 for testing. Front cover 150 may further include rails (not shown) that extend into housing 100 to help keep the multiple stacks of battery cells 115 in place. Front cover 150 is conventionally secured to the housing 100 in any suitable manner, as for example, with four bolts (not shown) that extend through front cover holes 152 to engage nuts 162.

Optionally, housing 100 includes a wall 118 that is secured to extensions of base 102, top wall 108, and side walls 104 beyond rear wall 112 to form space 160. This arrangement is provided so that the outer dimensions of housing 100 match those of the battery chambers used in lift trucks, pallet jacks, and the like. It should be understood that, depending on the width of the battery chambers as well as the width of cells 115 used in the particular application, spacers 106 may be provided inward and parallel to one of the vertical walls 104 to hold cells 115 securely in place and to ensure proper compression on the sides of cells 115.

Figure 2:
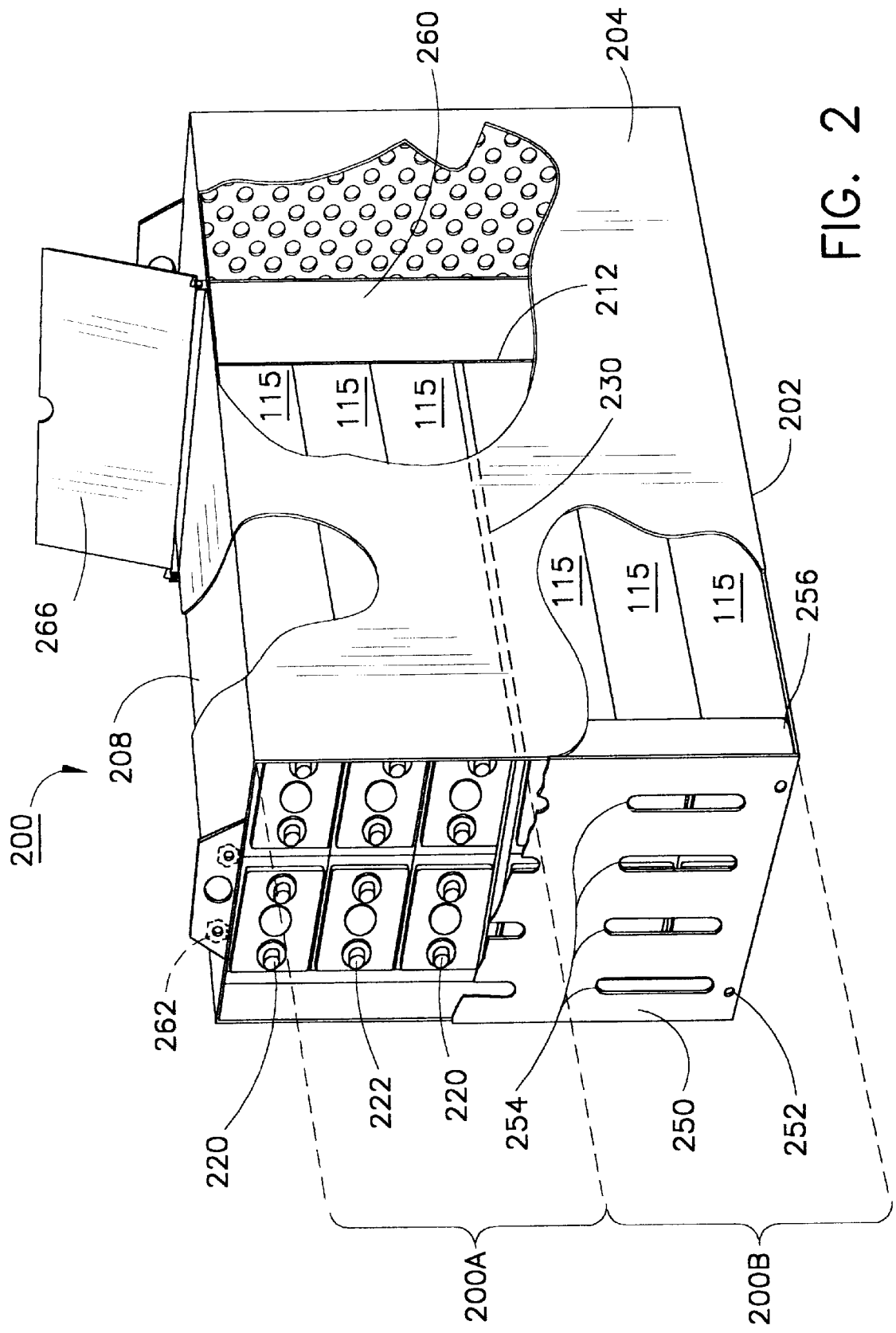
FIG. 2 is a front perspective cut-away view of a 12-cell battery system of the present invention.

Shown in FIG. 2 is an alternative embodiment of the battery system of the present invention for holding multiple side-by-side stacks of battery cells 115. A housing 200 includes a base 202, a top wall 208, a pair of vertical side walls 204, and a rear wall 212. Housing 200 is dimensioned to receive a total of twelve battery cells 115 arranged in two side-by-side columns of two stacks each. Housing 200 further includes a restraint 230, discussed in detail below, that extends between and is attached to vertical side walls 204. As in the first embodiment, a front cover 250 with vent openings 254 is secured to housing 200 in any suitable manner such as with bolts (not shown) that extend through holes 252 to engage nuts 262. This embodiment also includes a battery charger space 260 formed by extension of base 202 and side walls 204 beyond rear wall 212. Access to space 260 is provided via a hinged cover 266.

As shown schematically in FIGS. 1 and 2, a single restraint 130,230 is provided in each housing 100, 200. Each restraint extends horizontally between and attaches to the side walls 104, 204 of housings 100, 200 to maintain the side walls in substantially vertical position when stacks of battery cells 115 are assembled in housings 100, 200. Restraints 130, 230 also effectively divide the housings into two sections 100A, 100B and 200A, 200B. As shown in FIG. 1, restraint 130 has been located to maintain walls 104 substantially vertical while dividing the housing into cell-receiving sections capable of receiving single stacks of three cells each. The alternative embodiment is similar except that housing 200 has been sized to hold four stacks of cells, two stacks side-by-side above restraint 230 and two stacks below restraint 230. While the embodiments described herein illustrate configurations comprising stacks of three cells each, stacks may each consist of more than three cells. Likewise, while the preferred embodiments demonstrate battery housings vertically capable of holding two stacks with an equal number of cells in each stack, the housings can be vertically dimensioned to hold more than two stacks provided that restraints, as needed, are used to control bulging or flexing, and each stack may consist of a different number of cells.

Restraints 130, 230 are not required to serve as structural shelves or supports for stacks of cells 115. Whether the restraints 130, 230 are capable of this dual function depends upon the material selected for the restraint and the method of attaching the restraint to side walls 104, 204. For example, if restraints 130, 230 are formed as steel plates and welded to walls 104, 204, they will also structurally function as shelves. However, that is a secondary benefit of the present invention.

Because restraints 130, 230 are used primarily to hold side walls 104, 204 substantially vertical, a wide range of shapes and materials known in the art may be used to form restraints 130, 230. While the type of restraint used depends upon the particular application, any restraint chosen must have sufficient tensile strength and a low degree of elasticity so that they will not become deformed, stretched, or broken under assembled, in use conditions.

Figure 3:
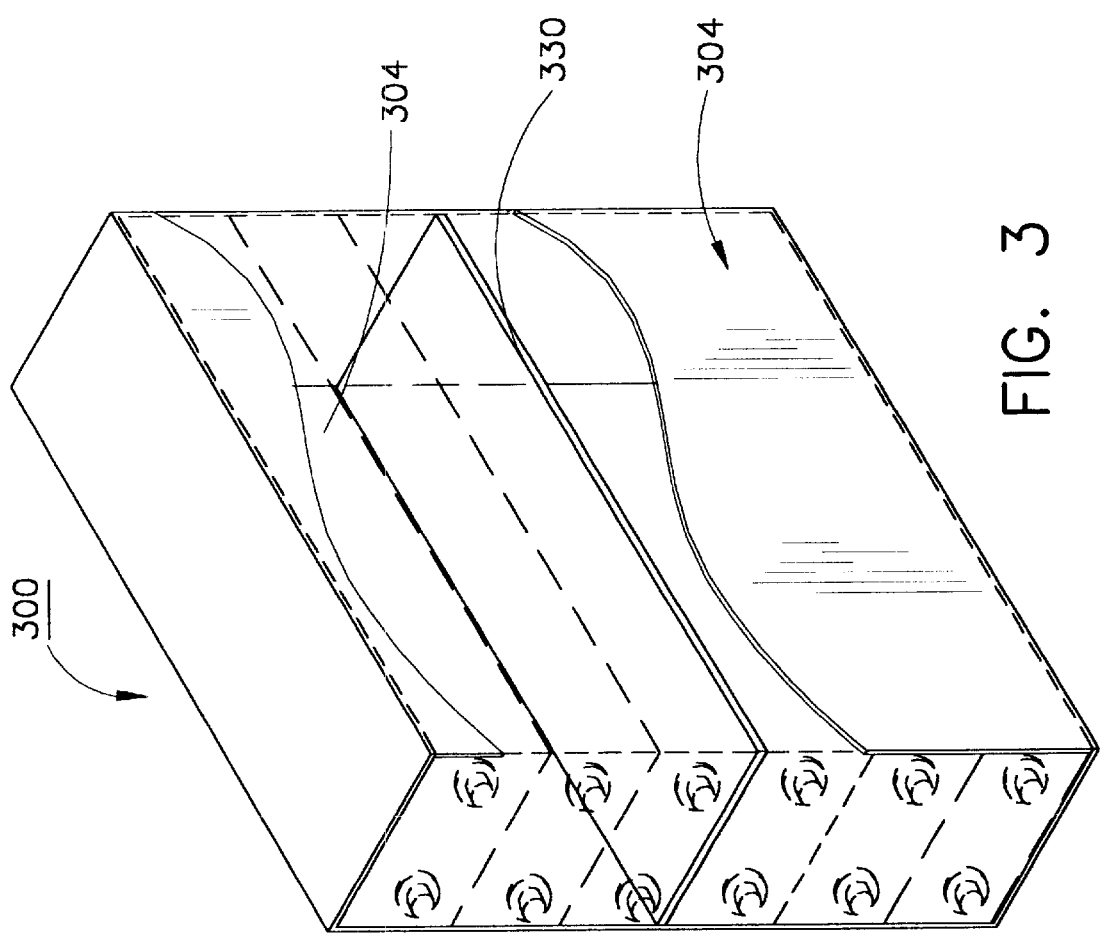
FIG. 3 is a front perspective view of a 6-cell battery system illustrating a single restraint formed as a continuous member.
Figure 4:
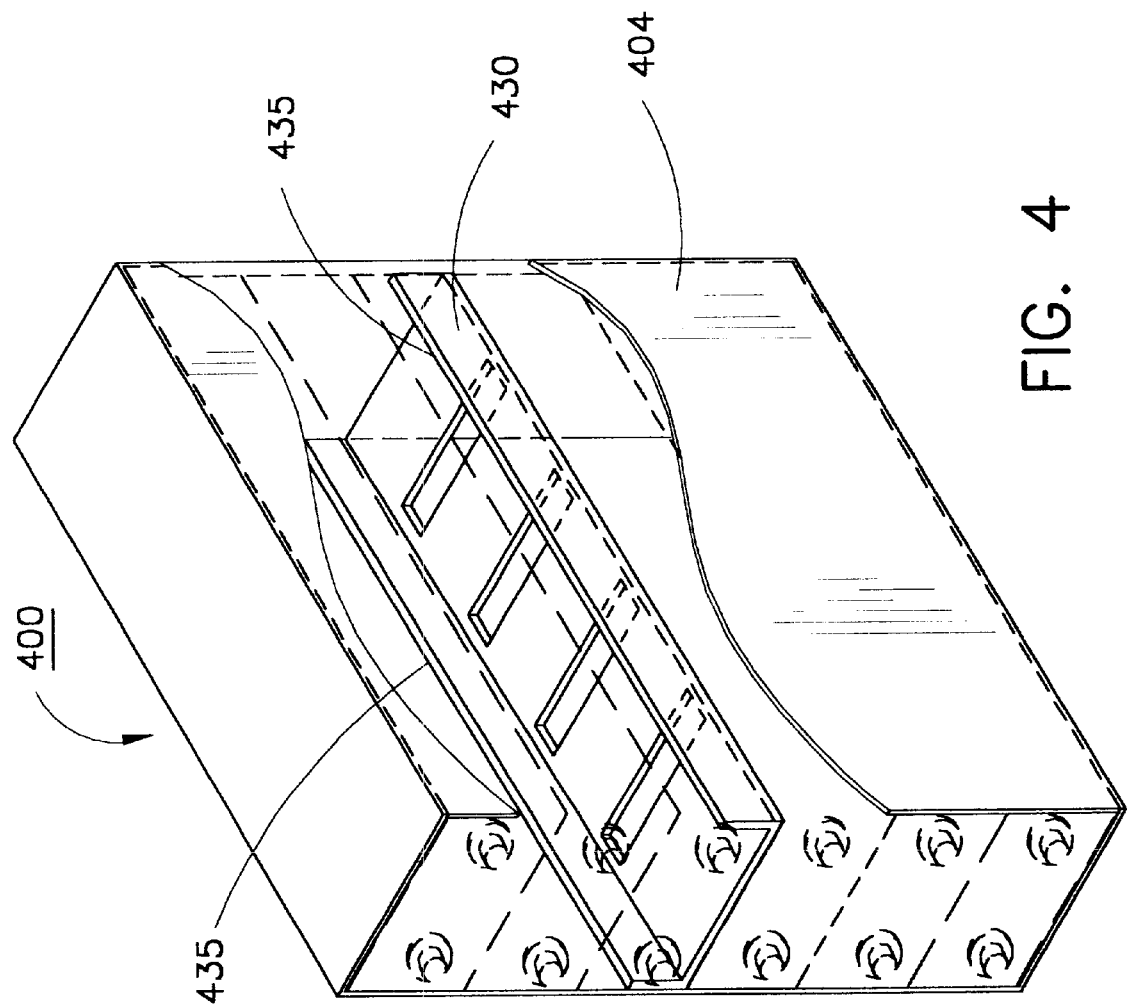
FIG. 4 is a front perspective view of a 6-cell battery system illustrating a slotted restraint formed as a single element.
Figure 5:
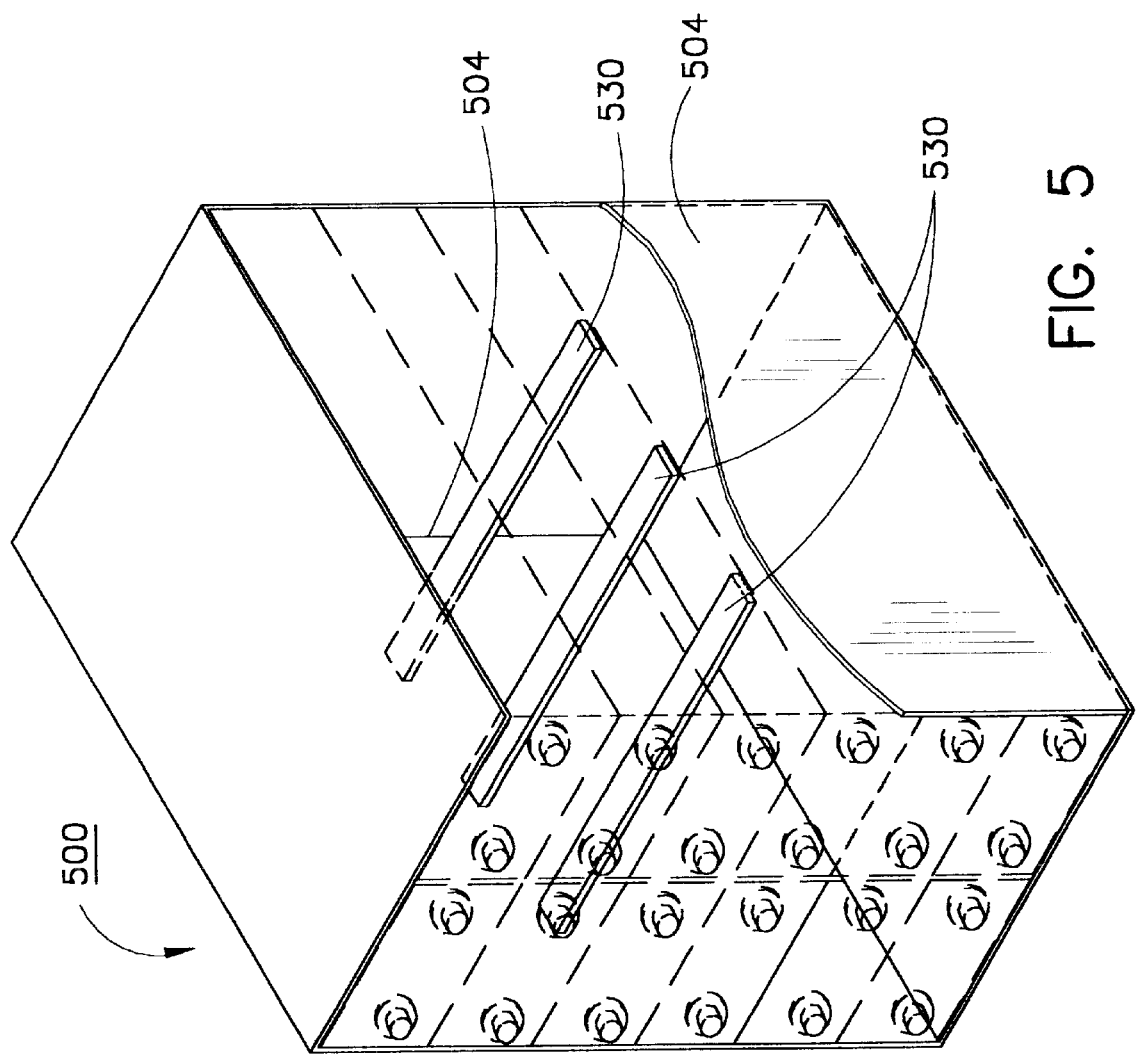
FIG. 5 is a front perspective view of a 12-cell battery compartment illustrating a restraint formed as a series of parallel bands.

FIGS. 3 through 5 are illustrative of three other ways of forming restraints, but as those skilled in the art will appreciate, these are far from exhaustive of the forms that may be used. For simplicity of illustration, the housings shown in FIGS. 3 through 5 hold two stacks of three cells 115 each, and do not illustrate other possible features of the housings such as those illustrated in FIGS. 1 and 2 and described hereinabove. FIG. 3 illustrates a continuous sheet or plate restraint 330 extending between and attached to walls 304. In the preferred embodiment, housing 300 and walls 304 are constructed of steel and restraint 330 is spot or tack-welded to walls 304. However, the materials of construction for housing 300 and restraint 330 are not limited to steel and welding; other materials and attachment means are also suitable, including other metals or durable plastics. Restraint 330 may also be attached to housing 300 by bonding, gluing, or mechanically attaching restraint 330 to side walls 304. The manner of attachment is not critical so long as battery cells 115 are properly compressed along their lengths. For example, FIG. 4 is illustrative of a restraint 430 formed as a slotted or perforated plate or sheet and having integrally formed flanges 435 extending generally perpendicularly upward (or downward) from restraint 430 for attachment to side walls 404. This is an alternative configuration to facilitate attachment to side walls 404, but there are others that are equally suitable and known to those skilled in the art. FIG. 5 is illustrative of a restraint 530 formed from a plurality of individual strips or bands, unconnected to one another, but extending between and attached to the side walls 504 of the battery housing.

Figure 6:
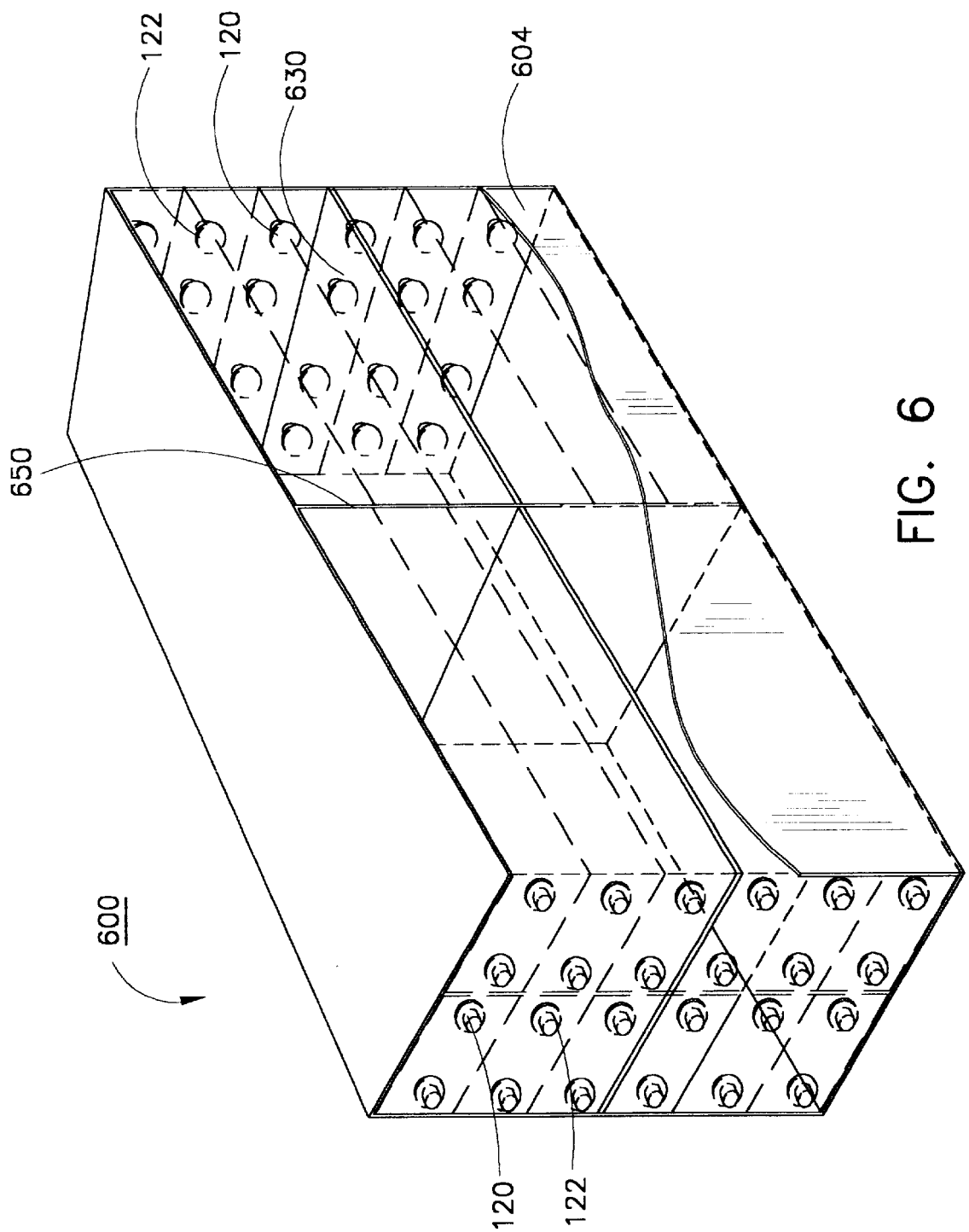
FIG. 6 is a front perspective view of a 24-cell battery compartment illustrating a restraint and inner partition combination.

As shown in FIG. 6, the housings of the present invention may be optionally separated into front and rear portions in addition to being divided into sections. Housing 600 is shown with a continuous horizontal restraint 630; however, restraint 630 could also be one or more slotted or perforated plates or a plurality of bands or strips. Housing 600 is further separated by an inner vertical partition 650 into front and rear portions, each portion capable of receiving four stacks of three cells each. Inner partition 650, as shown, is constructed of two pieces, one separating the upper section of housing 600 and the other separating the lower section of housing 600. Alternatively, inner partition 650 may be a single piece, wherein horizontal restraint 630 consists of two or more pieces, one dividing the front portion of housing 600 into two front sections and one dividing the rear portion of housing 600 into two rear sections. In any case, the combination of restraints 630 and partitions 650 effectively separates housing 600 into four cell-receiving sections.

Figure 7:
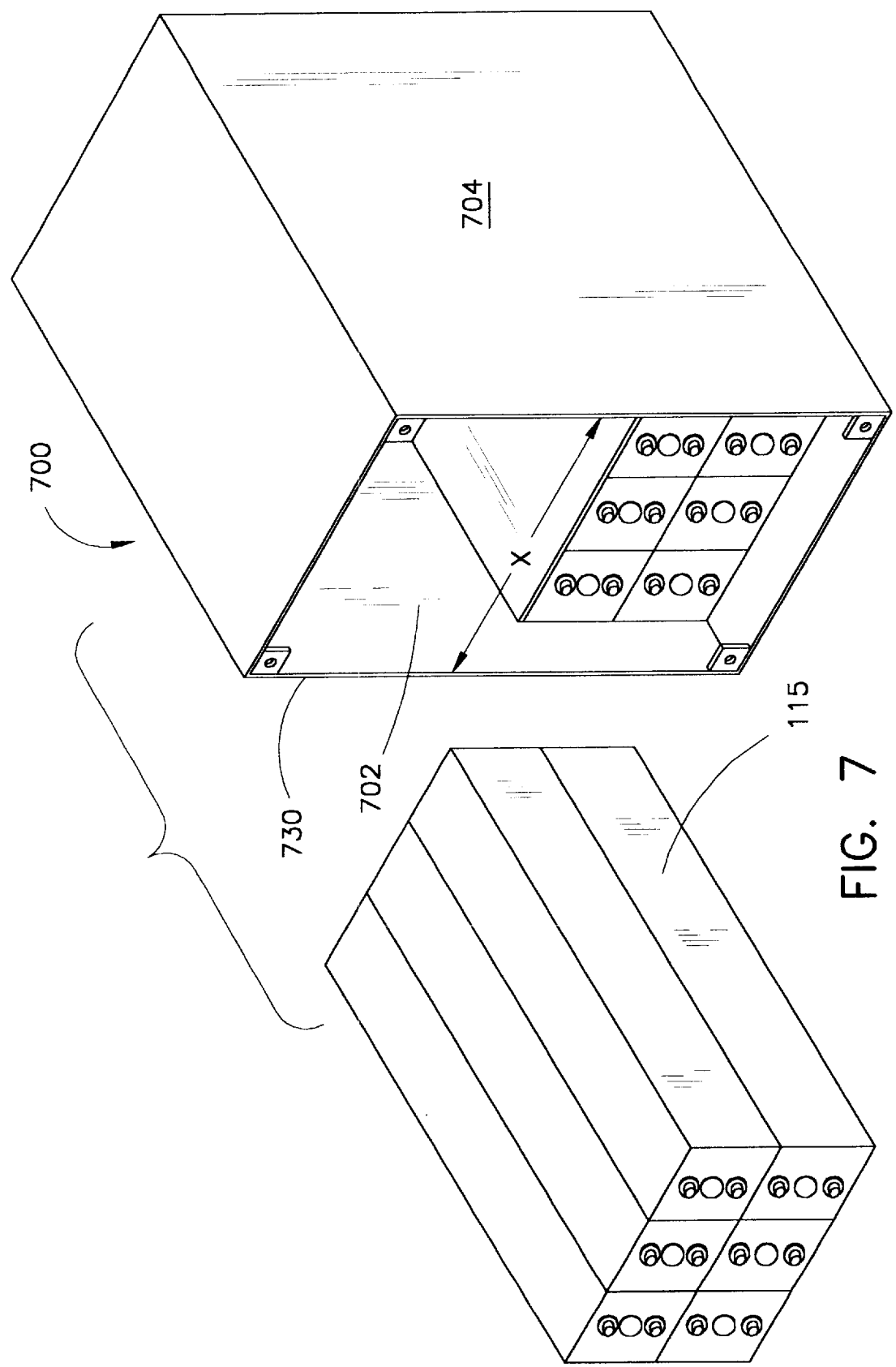
FIG. 7 is a front perspective view of a 12-cell battery compartment in which the cells are placed on their sides (narrow dimension) rather than on their bottom (wider dimension)

In FIG. 7, a somewhat different, but conceptually similar arrangement is illustrated. It has been determined that, although it is not advisable to position the cells with the longitudinal axis vertical (and the long axis of the plates vertical), an acceptable result is achieved by placing the cells on their sides (narrow dimension). While the plates will be vertical, (standing on one side edge), the longitudinal axes will still be horizontal and this will not lead to stratification and will not adversely affect the cycle life.

In this arrangement the side walls 702,704 of the housing 700 must still be supported. Thus a restraint 730 extends between side walls 702,704. However, it is the distance between side walls 702,704 that is important. This dimension must be less than the combined horizontal dimension of the stack of three side by side separately cased cells 115 when externally uncompressed. Thus, by carefully controlling and maintaining the width dimension X, a prescribed compression may be maintained between the plates and separators to insure good initial contact.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

We claim:

1. A battery system for deep discharge applications comprising valve-regulated, lead-acid cells, each cell including multiple positive and negative plates with separators therebetween assembled in a separate casing having exterior terminals outside the casing whereby the cells may be electrically interconnected and wherein said casing includes flexible walls that bulge outwardly when externally uncompressed due to internal pressure exerted by the plates and separators, said system comprising:

(a) a battery housing having a base, a top wall, and a pair of side walls;
    (b) at least one restraint extending horizontally between and attached to said side walls for preventing the bowing thereof, said at least one restraint dividing said battery housing into at least two sections;
    (c) at least one vertical stack containing at least three of said separately cased cells so positioned in each of said sections that said positive and negative plates are horizontally oriented;

(d) each of said separately cased cells in said stack bearing against at least one other said separately cased cell;

(e) the vertical inside dimension of each said section being less than the combined vertical dimension of the stack of said separately cased cells when externally uncompressed; and (f) whereby initial contact is established between the plates and separators.

2. The battery system of claim 1 further including at least one inner vertical partition extending between said side walls and separating each of said at least two sections into a front and rear portion.

3. A housing for receiving one or more stacks of at least three valve regulated, lead-acid cells in a battery assembly for deep discharge applications, each cell includes multiple positive and negative plates with separators therebetween assembled in a separate casing having exterior terminals outside the casing whereby the cells may be electrically interconnected and wherein said casing includes flexible walls that bulge outwardly when externally uncompressed due to internal pressure exerted by the plates and separators, said housing comprising:

(a) a base, a top wall, and a pair of side walls;

(b) at least one restraint extending horizontally between and attached to said side walls for preventing the bowing thereof, said at least one restraint dividing said battery housing into at least two sections;

(c) the vertical inside dimension of each said section being less than the combined vertical dimension of the stack of said three or more separately cased cells when initially uncompressed; and (d) whereby initial contact is established between the plates and separators when the cells are assembled in said sections of the housing.

4. A housing for receiving one or more stacks of at least three valve regulated, lead-acid cells in a battery assembly for deep discharge applications, each cell includes multiple positive and negative plates with separators therebetween assembled in a separate casing having exterior terminals outside the casing whereby the cells may be electrically interconnected and wherein said casing includes flexible walls that bulge outwardly when externally uncompressed due to internal pressure exerted by the plates and separators, said housing comprising:

(a) a base, a top wall, and a pair of side walls;

(b) at least one restraint extending horizontally between and attached to said side walls for preventing the bowing thereof, said at least one restraint dividing said battery housing into at least two sections;

(c) the vertical inside dimension of each said section being less than the combined vertical dimension of the stack of said three or more separately cased cells when initially uncompressed;

(d) at least one inner partition separating each of said at least two sections into two portions; and (e) whereby initial contact is established between the plates and separators when the cells are assembled in said sections of the housing.

5. A battery system for deep discharge applications comprising valve-regulated, lead-acid cells, each cell includes multiple positive and negative plates with separators therebetween assembled in a separate casing having exterior terminals outside the casing whereby the cells may be electrically interconnected and wherein said casing includes flexible walls that bulge outwardly when externally uncompressed due to internal pressure exerted by the plates and separators, said system comprising:

(a) a battery housing having a base, a top wall, and a pair of side walls;

(b) at least one restraint extending horizontally between and attached to said side walls for preventing the bowing therof, said at least one restraint dividing said battery housing into at least two sections;

(c) at least one horizontal stack containing at least three of said separately cased cells so positioned in each of said sections that the longitudinal dimension of said positive and negative plates is horizontally oriented;

(d) each of said separately cased cells in said stack bearing against at least one other said separately cased cell;

(e) the horizontal inside effective dimension of said housing between the side walls being less than the combined corresponding dimension of the stack of said separately cased cells when initially uncompressed;

(f) whereby initial contact is established between the plates and separators when the cells are assembled in said sections of the housing.

6. The battery system of claim 5 further including at least one inner vertical partition extending between said side walls and separating each of said at least two sections into a front and rear portion.

7. A housing for receiving one or more stacks of at least three valve regulated, lead-acid cells in a battery assembly for deep discharge applications, each cell includes multiple positive and negative plates with separators therebetween assembled in a separate casing having exterior terminals outside the casing whereby the cells may be electrically interconnected and wherein said casing includes flexible walls that bulge outwardly when externally uncompressed due to internal pressure exerted by the plates and separators, said housing comprising:

(a) a base, a top wall, and a pair of side walls;

(b) at least one restraint extending horizontally between and attached to said side walls for preventing the bowing thereof, said at least one restraint dividing said battery housing into at least two sections;

(c) the horizontal inside effective dimension of each of said sections between the side walls thereof being less than the combined corresponding dimension of the stack of said three or more separately cased cells when initially uncompressed; and (d) whereby initial contact is established between the plates and separators when the cells are assembled in said sections of the housing.

* * * * *